US012667830B2

(12) United States Patent
Digne et al.

(10) Patent No.: US 12,667,830 B2
(45) Date of Patent: Jun. 30, 2026

(54) METHOD FOR PREPARING A ZEOLITE-BASED CATALYST HAVING AN MFI STRUCTURAL CODE WITH IMPROVED DENSITY AND MECHANICAL STRENGTH

(71) Applicant: IFP Energies nouvelles, Rueil-Malmaison (FR)

(72) Inventors: Mathieu Digne, Rueil-Malmaison (FR); Antoine Fecant, Rueil-Malmaison (FR); Thomas Regal, Rueil-Malmaison (FR); Chloe Bertrand Drira, Rueil-Malmaison (FR)

(73) Assignee: IFP Energies nouvelles, Rueil-Malmaison (FR)

( * ) Notice: Subject to any disclaimer, the term of this patent is extended or adjusted under 35 U.S.C. 154(b) by 592 days.

(21) Appl. No.: 18/038,033

(22) PCT Filed: Nov. 8, 2021

(86) PCT No.: PCT/EP2021/080891
§ 371 (c)(1),
(2) Date: May 22, 2023

(87) PCT Pub. No.: WO2022/106230
PCT Pub. Date: May 27, 2022

(65) Prior Publication Data
US 2023/0356200 A1        Nov. 9, 2023

(30) Foreign Application Priority Data

Nov. 23, 2020    (FR) ...................................... 2011995

(51) Int. Cl.
| | |
|---|---|
| *B01J 29/46* | (2006.01) |
| *B01J 21/04* | (2006.01) |
| *B01J 35/02* | (2006.01) |
| *B01J 35/37* | (2024.01) |
| *B01J 35/40* | (2024.01) |
| *B01J 37/00* | (2006.01) |
| *B01J 37/02* | (2006.01) |
| *B01J 37/04* | (2006.01) |
| *B01J 37/10* | (2006.01) |
| *B01J 37/18* | (2006.01) |

(52) U.S. Cl.
CPC .............. *B01J 29/46* (2013.01); *B01J 21/04* (2013.01); *B01J 35/37* (2024.01); *B01J 35/40* (2024.01); *B01J 37/0009* (2013.01); *B01J 37/0207* (2013.01); *B01J 37/04* (2013.01); *B01J 37/10* (2013.01); *B01J 37/18* (2013.01);

*B01J 2229/36* (2013.01); *B01J 2229/37* (2013.01); *B01J 2229/38* (2013.01); *B01J 2229/42* (2013.01); *B01J 2235/15* (2024.01); *B01J 2235/30* (2024.01)

(58) Field of Classification Search
CPC ........ B01J 29/46; B01J 2235/30; B01J 35/37; B01J 35/40; B01J 21/04; B01J 37/0009; B01J 37/0207; B01J 37/04; B01J 37/10; B01J 37/18
See application file for complete search history.

(56) References Cited

U.S. PATENT DOCUMENTS

| | | | |
|---|---|---|---|
| 3,702,886 A | 11/1972 | Argauer et al. | |
| 4,206,085 A | 6/1980 | Lim et al. | |
| 4,418,235 A | 11/1983 | Haag et al. | |
| 4,788,377 A | 11/1988 | Chang et al. | |
| 5,063,187 A * | 11/1991 | Burgfels ................... | B01J 35/77 502/62 |
| 5,348,924 A | 9/1994 | Potter et al. | |
| 5,502,269 A | 3/1996 | Sarrazin et al. | |
| 5,569,806 A | 10/1996 | Cameron et al. | |
| 7,229,941 B2 | 6/2007 | Burgfels et al. | |
| 2019/0247837 A1 | 8/2019 | Ghosh et al. | |

FOREIGN PATENT DOCUMENTS

| | | |
|---|---|---|
| EP | 0034444 A2 | 8/1981 |

OTHER PUBLICATIONS

International Search report PCT/EP2021/EP080891 dated Feb. 10, 2022 (pp. 1-2).

* cited by examiner

*Primary Examiner* — Yong L Chu
(74) *Attorney, Agent, or Firm* — Millen, White, Zelano & Branigan, P.C.; Brion P. Heaney

(57) ABSTRACT

The present invention relates to an original process for the preparation of a catalyst in the form of an extrudate comprising an acid zeolite with the structural code MFI, the zeolite content being between 45% and 90% relative to the total mass of the catalyst, and a binder, and optionally containing a hydrogenating active phase, comprising at least a) the mixture of said MFI zeolite and the binder, the average size of the elementary particles of said MFI zeolite being between 110 and 800 nm, b) the addition of said mixture a) of a peptizing agent c) the addition to said mixture of a neutralizing agent d) the shaping by extrusion of the mixture e) optionally, the drying of the solid, f) the heat treatment of the said solid obtained in the presence of water vapor at a temperature between 400 and 1000° C. in the presence of an air flow containing from 1 to 60% by volume of water, and g) optionally, the introduction of one or more precursors of a hydrogenating active phase on the solid.

23 Claims, No Drawings

METHOD FOR PREPARING A ZEOLITE-BASED CATALYST HAVING AN MFI STRUCTURAL CODE WITH IMPROVED DENSITY AND MECHANICAL STRENGTH

FIELD OF THE INVENTION

The invention provides an original method for preparing a catalyst in the form of an extrudate based on an acidic MFI-type zeolite (preferably H-ZSM-5) introduced in high content with a binder comprising alumina, and optionally comprising a hydrogenating active phase. The type of catalyst obtained can be used in many heterogeneous catalysis applications requiring an acid function, notably ones for the transformation of hydrocarbons:

various processes for converting methanol (into olefins, into gasoline, etc.), converting olefins (into olefins, into gasoline, into diesel, etc.), converting paraffins into aromatics, alkylation processes, processes for the dewaxing of diesels, of oils, of pyrolysis products of plastics, of biomass pyrolysis products, etc.

PRIOR ART

U.S. Pat. No. 3,702,886 claims solid ZSM-5 and also its method of preparation.

U.S. Pat. Nos. 5,063,187 and 7,229,941 disclose catalysts based notably on ZSM-5 zeolite having zeolite primary crystallite structures and also agglomerate sizes of primary crystallites of particular zeolites.

U.S. Pat. No. 4,206,085 discloses a catalyst based on a zeolite/binder matrix having improved abrasion resistance.

Patent application US 2019/0247837 discloses a method for preparing a hydrocracking catalyst containing a ZSM-5 zeolite, a binder, and a hydrogenating phase.

Patent CN106608779 discloses a catalyst for producing propylene by catalytic cracking, the catalyst comprising a ZSM-5 zeolite, a binder, and also an element of the rare earth family.

U.S. Pat. No. 4,788,377 discloses a method for producing olefins from alcohol using a steam-treated ZSM-5 type zeolite.

To ensure high catalytic performance, it is often necessary to achieve high zeolite contents. The role of the binder in shaped zeolite catalysts is to ensure the cohesion of the units and thus permit sufficient mechanical strength for use as a catalyst.

Thus, high contents of zeolitic phases can give rise to fragility in the units, or a high content of binder to ensure good mechanical strength can limit catalytic performance.

SUBJECTS OF THE INVENTION

The invention provides an original process for preparing a catalyst in the form of an extrudate comprising an acidic MFI-type zeolite, preferably H-ZSM-5, the zeolite content being between 45% to 90% relative to the total mass of the catalyst, and a binder, preferably alumina, and optionally containing a hydrogenating active phase, comprising at least the following steps:

a) mixing of said MFI-type zeolite and of the binder, the average size of the elementary particles of said MFI zeolite measured by scanning electron microscopy being between 110 and 800 nm, preferably between 120 and 700 nm, very preferably between 150 and 500 nm, b) adding to said mixture obtained in step a) of a peptizing agent selected from nitric acid and carboxylic acids selected from acetic acid, citric acid and butyric acid, alone or as a mixture, c) adding to said mixture obtained in step b) of a neutralizing agent selected from inorganic bases selected from sodium hydroxide, potassium hydroxide, and ammonia, alone or as a mixture, and organic bases in solution selected from amines and quaternary ammonium compounds, alone or as a mixture, d) shaping by extrusion of the mixture obtained in step c) to obtain a solid, e) optionally, drying of the solid obtained in step d), f) heat-treating of said solid obtained in step d) or e) in the presence of steam at a temperature of between 400 and 1000° C. in the presence of a stream of air containing from 1% to 60% by volume of water, g) optionally, the introducing of one or more precursors of a hydrogenating active phase into the solid obtained in step f).

The proposed preparation scheme makes it possible—by combining various steps of preparation of the support/catalyst in an original manner—to obtain a catalyst having a porosity different from that of the prior art. Specifically, despite the high content of zeolite introduced, the process for preparing said catalyst results in an optimized pore volume (with minimization of macroporosity and control of mesopore distribution), making it possible to finely adjust the content by volume of zeolite in the reactor (i.e. the density in kg/m3). The content by volume of zeolite in the reactor is defined as the product of the TPD (tapped packing density) of the catalyst and the content by mass of zeolite in said catalyst. In addition, said process according to the invention makes it possible to improve the mechanical properties, which are of crucial importance for supports with a high zeolite content.

The type of catalyst obtained according to the invention can be used in many heterogeneous catalysis applications requiring an acid function, notably ones for the transformation of hydrocarbons: the various processes for converting methanol (into olefins, into gasoline, etc.), converting olefins (into olefins, into gasoline, into diesel, etc.), converting paraffins into aromatics, alkylation processes, processes for the dewaxing of diesels, of oils, of pyrolysis products of plastics, of biomass pyrolysis products, etc.

TERMINOLOGY AND CHARACTERIZATION TECHNIQUES

The catalyst and support of the present invention have a specific pore distribution, the macropore and mesopore volumes being measured by mercury intrusion and the micropore volume by nitrogen adsorption.

The term "macropores" is understood to mean pores, the opening of which is greater than 50 nm.

The term "mesopores" is understood to mean pores, the opening of which is between 2 nm and 50 nm inclusive.

The term "micropores" is understood to mean pores, the opening of which is less than 2 nm.

In the following description of the invention, specific surface area is understood to mean the BET specific surface area determined by nitrogen adsorption in accordance with standard ASTM D 3663-78 based on the Brunauer-Emmett-Teller method described in the journal "Journal of American Society", 60, 309, (1938).

The volume of the macropores and of the mesopores is measured by mercury intrusion porosimetry according to the standard ASTM D4284-83 at a maximum pressure of 4000 bar (400 MPa), using a surface tension of 484 dyne/cm and a contact angle of 140°. The wetting angle used was taken as equal to 140° following the recommendations of the publication "Techniques de l'ingénieur, traité analyse et caractérisation" [Techniques of the engineer, analysis and characterization treatise], pp. 1050-5, authors Jean Charpin and Bernard Rasneur.

The value at and above which the mercury fills all the intergranular voids is set at 0.2 MPa and it is considered that, above this value, the mercury penetrates into the pores of the sample.

The macropore volume of the catalyst or of the support is defined as being the cumulative volume of mercury introduced at a pressure of between 0.2 MPa and 30 MPa, corresponding to the volume contained in the pores having an apparent diameter of greater than 50 nm.

The mesopore volume of the catalyst or of the support is defined as being the cumulative volume of mercury introduced at a pressure of between 30 MPa and 400 MPa, corresponding to the volume contained in the pores having an apparent diameter of between 3.6 and 50 nm.

The micropore volume is measured by nitrogen porosimetry. The quantitative analysis of the microporosity is carried out by means of the "t" method (Lippens-De Boer method, 1965), which corresponds to a transform of the starting adsorption isotherm, as described in the publication "Adsorption by powders and porous solids. Principles, methodology and applications", authors F. Rouquérol, J. Rouquérol, and K. Sing, Academic Press, 1999.

In the following description of the invention, the "total pore volume" of the alumina or of the support or of the catalyst is understood to mean the sum of the mesopore, macropore (measured by mercury intrusion porosimetry), and micropore (measured by nitrogen porosimetry) volumes.

The mechanical strength of the material according to the invention is determined by the single-pellet crush strength (SPCS) test. This is a standardized test (standard ASTM D4179-01) that consists of subjecting a material in the form of a millimeter-sized unit, such as a bead, a pellet or an extrudate, to a break-generating compressive force. The analysis is repeated on a certain number of solids taken individually and typically on a number of solids of between 10 and 200. The average of the measured breaking side forces constitutes the average SPCS, which is expressed in the case of granules in units of force (N) and in the case of extrudates in units of force per unit length (daN/mm or decanewtons per millimeter of extrudate length).

The loss on ignition (LOI) of a solid is the relative loss of mass (expressed in %) of a solid after having been heated to 1000° C. in a muffle furnace for 3 h.

The tapped packing density (TPD) is defined as the bulk density of a sample after tapping. It is measured as follows: a given weight of the support or of the mass is introduced into a graduated measuring cylinder so as to hold the agglomerates in a given volume. The cylinder is then vibrated until all settling has ceased and until a constant volume has been attained. The weight of agglomerate occupying a unit volume is then calculated. The packing density in the tapped state (TPD) is determined according to standard NF EN ISO 787-11.

Description of SEM for Particle Size Measurement

The size of the zeolite particles is measured by scanning electron microscopy at a magnification of 10 000 to 100 000 on a Zeiss Supra 40 instrument. An equivalent diameter is calculated by any method known to those skilled in the art on a number of units greater than 200. Said units being clearly delimited from one another, agglomerates are not considered. The average size of the elementary zeolite particles is then calculated as the arithmetic mean of the measured equivalent diameters of each unit. The average size of the elementary particles is a number-average size.

In the text hereinbelow, groups of chemical elements are given according to the CAS classification (CRC Handbook of Chemistry and Physics, published by CRC Press, editor in chief D. R. Lide, 81st edition, 2000-2001). For example, group VIII according to the CAS classification corresponds to the metals of columns 8, 9 and 10 according to the new IUPAC classification.

For the purposes of the present invention, the various embodiments presented may be employed alone or in combination with each other, without any limit to their combination where this is technically feasible.

For the purposes of the present invention, the various ranges of parameters for a given step, such as pressure ranges and temperature ranges, may be employed alone or in combination. For example, for the purposes of the present invention, a preferred range of pressure values may be combined with a more preferred range of temperature values.

DETAILED DESCRIPTION OF THE INVENTION

The invention provides an original process for preparing a catalyst in the form of an extrudate comprising an acidic MFI-type zeolite, preferably H-ZSM-5, the zeolite content being between 45% to 90% relative to the total mass of the catalyst, and a binder, preferably alumina, and optionally containing a hydrogenating active phase.

Preparation of the Catalyst

In accordance with the invention, said catalyst comprises at least one MFI-type zeolite and a binder.

According to step a), the MFI-type zeolite is mixed with the binder. According to a preferred method of preparation, said MFI-type zeolite and the binder may be mixed, without this being limiting, in the form of powder, ground powder, suspension, or suspension that has undergone a deagglomeration treatment. Said zeolite and the binder may advantageously be mixed by mechanical mixing or by suspension at a concentration adjusted to the target zeolite end content and target binder end content in the catalyst prepared according to the present invention.

MFI-Type Zeolite

MFI-type zeolites are crystalline microporous solids and have been described in the literature (G. T. Kokotailo, S. L. Lawton, D. H. Olson, W. M. Meier, Nature, vol. 272, pp. 437-438, 1978; D. H. Olson, G. T Kokotailo, S. L. Lawton, W. M. Meier, J. Phys. Chem., vol. 85, pp. 2238-2243, 1981; H. van Koningsveld, J. C. Jansen, H. van Bekkum, Zeolites, vol. 10, pp. 235-242, 1990). The crystal structure of these materials is described in the documents "Collection of simulated XRD powder patterns for zeolites", ed. M. M. J. Treacy and J. B. Higgins, Fifth Revised Edition, 2007, pp. 280-281 and "Atlas of zeolite framework types", C. Baerlocher, L. B. McCusker, D. H. Olson, sixth revised edition, 2007, pp. 212-213.

The processes for preparing MFI-type zeolites are also described in said documents.

Said MFI-type zeolite has a chemical composition expressed on an anhydrous basis in terms of moles of oxides defined by the following general formula: (96-a) $XO_2$: a/2 $Y_2O_3$: a/2 $M_{2/n}O$, in which X represents at least one tetravalent element, Y represents at least one trivalent element, M is at least one alkali metal and/or alkaline earth metal of valency n, and x<27.

X is preferably selected from silicon, germanium, titanium, and a mixture of at least two of these tetravalent elements; very preferably, X is silicon and Y is preferably selected from aluminum, boron, iron, indium, and gallium; very preferably, Y is aluminum. M is preferably selected from lithium, sodium, potassium, calcium, magnesium, and a mixture of at least two of these metals, and very preferably M is sodium. Preferably, X represents silicon; said MFI-type zeolite according to the invention is then an entirely silicic solid when the element Y is absent from the composition of said MFI-type zeolite. It is also advantageous to use as element X a mixture of a plurality of elements, especially a mixture of silicon with another element X selected from germanium and titanium, preferably germanium. Thus, when silicon is present as a mixture with another element X, said MFI-type zeolite according to the invention is then a crystalline metallosilicate exhibiting an X-ray diffraction pattern identical to that described in "Collection of simulated XRD powder patterns for zeolites", eds. M. M. J. Treacy and J. B. Higgins, Fifth Revised Edition, 2007, p. 280-281 when it is in its calcined form. Even more preferably and in the presence of an element Y, where X is silicon and Y is aluminum: said MFI-type zeolite according to the invention is then an aluminosilicate. Preferably, said MFI-type zeolite according to the invention is in the form of an aluminosilicate.

Preferably, the average size of the elementary particles of MFI-type zeolite measured by scanning electron microscopy is between 110 and 800 nm, preferably between 120 and 700 nm, very preferably between 150 and 500 nm.

Preferably, the MFI-type zeolite is ZSM-5.

Preferably, the molar ratio of the number of silicon atoms to the number of aluminum atoms Si/Al is less than 100, preferably less than 70, and very preferably less than 50.

The MFI-type zeolite included in the composition of the catalyst according to the invention advantageously undergoes an exchange through at least one treatment with a solution of at least one ammonium salt so as to obtain the ammonium form of the MFI-type zeolite, which, once calcined, leads to the acid form ($H^+$) of said MFI-type zeolite. This exchange step may be carried out at any stage in the preparation of the catalyst, i.e. after the step of preparing the MFI-type zeolite, after the step of shaping the MFI-type zeolite with a porous mineral binder, or even after the step of optionally introducing the hydrogenating-dehydrogenating phase.

Said MFI-type zeolite included in the composition of the catalyst used in the process according to the invention is advantageously at least partly, and preferably virtually totally, in acid form, i.e. in the $H^+$ form.

In accordance with the invention, the zeolite content being between 45% to 90% relative to the total mass of the catalyst and preferably between, preferably between 50% to 80% by weight, and very preferably between 55% to 75% by weight.

Binder

According to the invention, the catalyst used also contains a binder. Said binder may advantageously be amorphous or crystalline. Preferably, said binder is advantageously selected from the group composed of the following oxides or the hydrate forms thereof: alumina, silica, silica/alumina, clays, titanium oxide, boron oxide, and zirconia, taken, alone or as a mixture. Preferably, said binder is alumina or an aluminum hydroxide, alone or as a mixture. Preferably, said binder is alumina in any of its forms known to those skilled in the art, for instance α-, γ-, η- or δ-aluminas or hydroxides, such as boehmite, bayerite or gibbsite. Said aluminas differ in their specific surface area and their pore volume. The loss on ignition of the binder is advantageously greater than 15%.

Preferably, said catalyst comprises from 10% to 60% by weight of binder, preferably from 20% to 50% by weight, relative to the total mass of said catalyst.

According to step b), a peptizing agent selected from nitric acid and carboxylic acids selected from acetic acid, citric acid and butyric acid, alone or as a mixture, is added to said mixture resulting from step a). Preferably, the peptizing agent is nitric acid.

The amount of peptizing agent may advantageously be defined as a total acid content, expressed as a percentage relative to the mass of dried binder introduced in step a) and between 0.1% and 12% by weight. Preferably, the total acid content is between 0.1% and 6% by weight, very preferably between 0.1% and 4% by weight.

Water can also be introduced during step b), such that the loss on ignition of the mixture is between 20 and 80% and preferably between 30 and 70%.

According to step c), a neutralizing agent selected from inorganic bases selected from sodium hydroxide, potassium hydroxide, and ammonia, alone or as a mixture, and organic bases in solution selected from amines and quaternary ammonium compounds, alone or as a mixture, is added to said mixture resulting from step b). Preferably, the organic bases in solution are selected from alkylethanolamines and ethoxylated alkylamines. The organic bases are preferably used as a solution in water. Very preferably, the neutralizing agent is an inorganic base and preferably ammonia and preferably ammonia in aqueous solution ($NH_4OH$).

The amount of neutralizing agent can be defined as a degree of neutralization expressed as a molar percentage of base relative to the amount of acid introduced in step b) and is between 1 and 200%. Preferably, the degree of neutralization expressed as a molar percentage of base relative to the amount of acid is between 10 and 100%.

According to step d), the mixture obtained in step c) is shaped by extrusion so as to obtain a solid. In order to facilitate this step, various additives may be added. Examples of additives include notably cellulose, carboxymethylcellulose, carboxyethylcellulose, tall oil, xanthan gums, surfactants, flocculants such as polyacrylamides, carbon black, starches, stearic acid, polyacrylic alcohol, polyvinyl alcohol, biopolymers, glucose, polyethylene glycols, etc.

The extrusion may advantageously be carried out with any conventional commercially available tool. The mixture resulting from step c) is advantageously extruded through a die, for example using a piston or a single-screw or twin-screw extruder. This extrusion step may advantageously be carried out by any method known to those skilled in the art so as to obtain a solid or raw material.

The process according to the invention may also optionally include a step e) of drying the solid obtained in the step d) of shaping. Said drying step is advantageously carried out by any technique known to those skilled in the art.

Preferably, the drying is carried out in a stream of air, it being possible for said stream of air to be dry or humid. Said drying may also advantageously be carried out in a stream of any oxidizing, reducing or inert gas. Preferably, the drying is advantageously carried out between 50° C. and 180° C., preferably between 60° C. and 150° C., and very preferably between 80° C. and 130° C. Preferably, said drying step takes place for a period of between 2 h and 10 h.

According to step f), a step of heat-treating of the solid obtained in step d) or e) in the presence of steam is executed at a temperature of between 400 and 1000° C. for a period advantageously of between 1 and 24 h, in the presence of a stream of air containing from 1% to 60% by volume of water.

Preferably, said step f) is executed in the presence of a stream of air having a water content of between 1% and 50% by volume, and very preferably between 1% and 10% by volume. Preferably, said heat-treatment step f) takes place at a temperature of between 450° C. and 850° C. Preferably, said heat-treatment step f) takes place for a period of between 2 h and 10 h.

The process according to the invention may also optionally include a step g) of introducing one or more precursors of a hydrogenating active phase into the solid obtained in step f).

Preferably, the precursor(s) of the hydrogenating active phase comprise(s) at least one group VIII element and optionally at least one group VIB element. Preferably, the group VIII element is selected from nickel and cobalt, very preferably the group VIII element is nickel. When the hydrogenating phase comprises a group VIB element, this is preferably molybdenum or tungsten, very preferably molybdenum.

The precursors of the hydrogenating phase may advantageously be introduced by any method known to those skilled in the art, such as dry impregnation, excess impregnation, ion exchange, etc.

Preferably, the precursors of the hydrogenating phase are introduced by dry impregnation. The precursors of the hydrogenating phase may advantageously be introduced by one or more operations for impregnation of the solid obtained in step f) with a solution containing at least one precursor of at least one metal selected from the group composed of group VIII elements and optionally at least one precursor of at least one metal selected from the group composed of group VIB elements. When more than one precursor is used, they are preferably introduced at the same time. In the preferred variant in which the group VIII element is nickel or cobalt, and the group VIB elements are molybdenum or tungsten, examples of precursors that can be used in the catalyst preparation process are nickel nitrate, nickel dihydroxide, nickel acetate, nickel carbonate, cobalt nitrate, cobalt dihydroxide, cobalt acetate, cobalt carbonate, ammonium heptamolybdate, molybdic acid, molybdenum oxide, ammonium metatungstate, tungstic acid or tungsten oxide. Any other compound known to those skilled in the art that has sufficient solubility may also be used.

The impregnation of the precursors of the elements selected from the group VIII elements and optionally the group VIB elements may advantageously be facilitated by adding phosphoric acid to the aqueous solutions.

In the case where step g) is included, the content of the group VIII element is advantageously between 0.1% and 10% by weight of oxide relative to the total mass of said catalyst, preferably between 0.5% and 8% by weight of oxide, and very preferably between 1% and 6% by weight of oxide.

In the variant where the hydrogenating active phase comprises a group VIB element, the content of the group VIB element is advantageously between 1% and 40% by weight of oxide relative to the total mass of said catalyst, preferably between 2% and 35% by weight of oxide, and very preferably between 5% and 30% by weight of oxide.

The catalyst may also advantageously contain phosphorus: the phosphorus content is advantageously between 0.5% and 15% by weight of oxide $P_2O_5$ relative to the total mass of said catalyst, preferably between 1% and 10% by weight of oxide.

After impregnation of the constituent elements of the hydrogenating phase, the solid thus filled with the impregnation solution may optionally undergo a step h) of maturing at room temperature, for a period of between 0.5 h and 24 h, preferably between 1 h and 6 h.

After impregnation, and an optional step of maturing, the solid obtained undergoes a step i) of drying for a period of between 0.5 h and 24 h, preferably between 1 h and 12 h. Preferably, the drying is carried out in a stream of air, it being possible for said stream of air to be dry or humid. Preferably, the drying is advantageously carried out at between 50° C. and 180° C., preferably between 60° C. and 150° C.

Said dried, optionally matured solid then optionally undergoes a step j) of calcining for a period of between 0.5 h and 24 h, preferably between 1 h and 12 h. Said calcining step is advantageously carried out in the presence of molecular oxygen, for example by flushing with air, it being possible for the air to be dry or humid, at a temperature advantageously of between 200° C. and 600° C., preferably between 300° C. and 500° C.

The hydrogenating active phase of the catalyst used in the process according to the invention is preferably used in sulfurized form. The sulfurization of the catalyst may be carried out in situ or ex situ by any method known to those skilled in the art. In the case of an in-situ sulfurization step, the catalyst is sulfurized by treating with a feedstock containing at least one sulfur compound that, once decomposed, results in the fixing of sulfur into the active phase. This feedstock may be gaseous or liquid, for example hydrogen containing $H_2S$, or a liquid containing at least one sulfur compound. In the case of ex-situ sulfurization, a sulfur compound may be introduced into the catalyst optionally in the presence of another compound. The catalyst is subsequently dried, then transferred to the reactor used to execute the process of the invention. In this reactor, the catalyst is then treated with hydrogen so as to transform at least part of the main metal into sulfide. A procedure that is particularly suitable for use in the invention is the one described in patents FR-B-2 708 596 and FR-B-2 708 597.

Characteristics of the Catalyst Obtained

The preparation process according to the present invention has the notable advantage of resulting in a porous zeolite catalyst having an entirely satisfactory mechanical strength with respect to the pore volumes that characterize it, said strength being embodied by the single-pellet crush strength (SPCS) value, preferably at least 0.8 daN/mm, very preferably at least 0.9 daN/mm.

The preparation process according to the present invention makes it possible to obtain a catalyst with a high content of zeolite, said catalyst advantageously having a total pore volume, as measured by mercury intrusion porosimetry, of between 0.25 and 0.8 ml/g and preferably of between 0.35 and 0.7 ml/g.

The mesopore volume of the catalyst prepared according to the invention, i.e. volume contained in the pores of diameter between 2 and 50 nm inclusive, as measured by mercury intrusion porosimetry, is between 0.1 and 0.6 ml/g and preferably between 0.2 and 0.5 ml/g.

The macropore volume of the catalyst prepared according to the invention, i.e. volume contained in the pores of diameter greater than 50 nm, as measured by mercury intrusion porosimetry, is between 0 and 0.4 ml/g and preferably between 0 and 0.2 ml/g.

The catalyst according to the invention generally has a specific surface area of greater than 250 m²/g, preferably greater than 300 m²/g, and preferably greater than 320 m²/g.

According to the invention, the content of MFI-type zeolite in the catalyst according to the invention is between 45% to 90% by weight relative to the total mass of said catalyst and preferably between 55% to 80% by weight.

The zeolite content by volume of the catalyst according to the invention is advantageously greater than 350 kg/m³, preferably greater than 400 kg/m³.

The TPD of the catalyst according to the invention is advantageously between 0.5 and 1.0 g/ml and preferably between 0.6 and 0.9 g/ml.

The type of catalyst obtained can be used in many heterogeneous catalysis applications requiring an acid function, notably ones for the transformation of hydrocarbons: the various processes for converting methanol (into olefins, into gasoline, etc.), converting olefins (into olefins, into gasoline, into diesel, etc.), converting paraffins into aromatics, alkylation processes, and processes for the dewaxing of diesels, of oils, of pyrolysis products of plastics and of biomass pyrolysis products.

The invention is illustrated by the examples that follow, which are in no way limiting in nature.

EXAMPLES

Example 1: Preparation of Catalyst A
(Noninventive)

For the preparation of catalyst A, a ZSM-5 MFI-type zeolite having an average elementary particle size of the order of 1 to 3.5 μm, an Si/Al atomic ratio of 22, and in the $NH_4$ form (Zeolyst®) is shaped with a boehmite binder (Sasol®). The boehmite and zeolite powders are dry-mixed in respective mass percentages of 30/70. They are then introduced into a closed tank of a double sigma blade kneader (Guittard®) of the MX series. A peptizing agent, nitric acid ($HNO_3$), is added so as to achieve an acid level of 4%. Water is also gradually introduced so as to achieve an LOI of around 50%, the value being adjusted according to the formulation so as to obtain a homogeneous and cohesive paste. After mixing for 30 min, a neutralizing agent, ammonia ($NH_4OH$), is added to the paste. The amount of neutralizing agent used is adjusted so as to achieve a neutralization level of 40%. The paste is kneaded for another 15 min and then extruded using a piston extruder through a die 3 mm in diameter. The extrudates thus obtained are dried (1 night at 120° C. in a ventilated oven in air) and then calcined at 540° C. for 4 hours in humid air having a water content equivalent to 6% by volume.

The characteristics of the catalyst obtained are given in Table 1 below.

Example 2: Preparation of Catalyst B
(Noninventive)

For the preparation of catalyst B, a ZSM-5 MFI-type zeolite having an average elementary particle size of the order of 150 to 500 nm, an Si/Al atomic ratio of 25, and in the $NH_4$ form (Zeolyst®) is shaped with a boehmite binder (Sasol®). The boehmite and zeolite powders are dry-mixed in respective mass percentages of 30/70. They are then introduced into a closed tank of a double sigma blade kneader (Guittard®) of the MX series. A peptizing agent (nitric acid, $HNO_3$) is added so as to achieve an acid level of 4%. Water is also gradually introduced so as to achieve an LOI of around 50%, the value being adjusted according to the formulation so as to obtain a homogeneous and cohesive paste. No neutralizing agent is added to the paste. The paste is extruded using a piston extruder through a die 3 mm in diameter. The extrudates thus obtained are dried (1 night at 120° C. in a ventilated oven in air) and then calcined at 540° C. for 4 hours in humid air having a water content equivalent to 6% by volume.

The characteristics of the catalyst obtained are given in Table 1 below.

Example 3: Preparation of Catalyst C
(Noninventive)

For the preparation of catalyst C, a ZSM-5 MFI-type zeolite having an average elementary particle size of the order of 150 to 500 nm, an Si/Al atomic ratio of 25, and in the $NH_4$ form (Zeolyst®) is shaped with a boehmite binder (Sasol®). The boehmite and zeolite powders are dry-mixed in respective mass percentages of 30/70. They are then introduced into a closed tank of a double sigma blade kneader (Guittard®) of the MX series. A peptizing agent (nitric acid, $HNO_3$) is added so as to achieve an acid level of 4%. Water is also gradually introduced so as to achieve an LOI of around 50%, the value being adjusted according to the formulation so as to obtain a homogeneous and cohesive paste. After mixing for 30 min, a neutralizing agent (ammonia, $NH_4OH$) is added to the paste. The amount of neutralizing agent used is adjusted so as to achieve a neutralization level of 40%. The paste is kneaded for another 15 min and then extruded using a piston extruder through a die 3 mm in diameter. The extrudates thus obtained are dried (1 night at 120° C. in a ventilated oven in air) and then calcined at 540° C. for 4 hours in dry air.

The characteristics of the catalyst obtained are given in Table 1 below.

Example 4: Preparation of Catalyst D
(Noninventive)

For the preparation of catalyst D, a ZSM-5 MFI-type zeolite having an average elementary particle size of the order of 1 to 2 μm, an Si/Al atomic ratio of 22, and in the $NH_4$ form (Zeolyst®) is shaped with a boehmite binder (Sasol®). The boehmite and zeolite powders are dry-mixed in respective mass percentages of 40/60. They are then introduced into a closed tank of a double sigma blade kneader (Guittard®) of the MX series. A peptizing agent (nitric acid, $HNO_3$) is added so as to achieve an acid level of 4%. Water is also gradually introduced so as to achieve an LOI of around 50%, the value being adjusted according to the formulation so as to obtain a homogeneous and cohesive paste. After mixing for 30 min, a neutralizing agent (ammonia, $NH_4OH$) is added to the paste. The amount of neutralizing agent used is adjusted so as to achieve a neutralization level of 40%. The paste is kneaded for another 15 min and then extruded using a piston extruder through a die 3 mm in diameter. The extrudates thus obtained are dried (1 night at 120° C. in a ventilated oven in air) and then calcined at 540° C. for 4 hours in humid air having a water content equivalent to 6% by volume.

The characteristics of the catalyst obtained are given in Table 1 below.

Example 5: Preparation of Catalyst E (Noninventive)

For the preparation of catalyst E, a ZSM-5 MFI-type zeolite having an average elementary particle size of the order of 150 to 500 nm, an Si/Al atomic ratio of 25, and in the NH$_4$ form (Zeolyst®) is shaped with a boehmite binder (Sasol®). The boehmite and zeolite powders are dry-mixed in respective mass percentages of 50/50. They are then introduced into a closed tank of a double sigma blade kneader (Guittard®) of the MX series. A peptizing agent (nitric acid, HNO$_3$) is added so as to achieve an acid level of 4%. Water is also gradually introduced so as to achieve an LOI of around 50%, the value being adjusted according to the formulation so as to obtain a homogeneous and cohesive paste. After mixing for 30 min, a neutralizing agent (ammonia, NH$_4$OH) is added to the paste. The amount of neutralizing agent used is adjusted so as to achieve a neutralization level of 40%. The paste is kneaded for another 15 min and then extruded using a piston extruder through a die 3 mm in diameter. The extrudates thus obtained are dried (1 night at 120° C. in a ventilated oven in air) and then calcined at 540° C. for 4 hours in dry air.

The characteristics of the catalyst obtained are given in Table 1 below.

Example 6: Preparation of Catalyst F (Inventive)

For the preparation of catalyst F, a ZSM-5 MFI-type zeolite having an average elementary particle size of the order of 150 to 500 nm, an Si/Al atomic ratio of 25, and in the NH$_4$ form (Zeolyst®) is shaped with a boehmite binder (Sasol®). The boehmite and zeolite powders are dry-mixed in a mass ratio of 30/70. They are then introduced into a closed tank of a double sigma blade kneader (Guittard®) of the MX series. A peptizing agent (nitric acid, HNO$_3$) is added so as to achieve an acid level of 4%. Water is also gradually introduced so as to achieve an LOI of around 50%, the value being adjusted according to the formulation so as to obtain a homogeneous and cohesive paste. After mixing for 30 min, a neutralizing agent (ammonia, NH$_4$OH) is added to the paste. The amount of neutralizing agent used is adjusted so as to achieve a neutralization level of 100%. The paste is kneaded for another 15 min and then extruded using a piston extruder through a die 3 mm in diameter. The extrudates thus obtained are dried (1 night at 120° C. in a ventilated oven in air) and then calcined at 540° C. for 4 hours in humid air having a water content equivalent to 6% by volume.

The characteristics of the catalyst obtained are given in Table 1 below.

Example 7: Preparation of Catalyst G (Inventive)

For the preparation of catalyst G, a ZSM-5 MFI-type zeolite having an average elementary particle size of the order of 150 to 500 nm, an Si/Al atomic ratio of 25, and in the NH$_4$ form (Zeolyst®) is shaped with a boehmite binder (Sasol®). The boehmite and zeolite powders are dry-mixed in a mass ratio of 40/60. They are then introduced into a closed tank of a double sigma blade kneader (Guittard®) of the MX series. A peptizing agent (nitric acid, HNO$_3$) is added so as to achieve an acid level of 4%. Water is also gradually introduced so as to achieve an LOI of around 50%, the value being adjusted according to the formulation so as to obtain a homogeneous and cohesive paste. After mixing for 30 min, a neutralizing agent (ammonia, NH$_4$OH) is added to the paste. The amount of neutralizing agent used is adjusted so as to achieve a neutralization level of 40%. The paste is kneaded for another 15 min and then extruded using a piston extruder through a die 3 mm in diameter. The extrudates thus obtained are dried (1 night at 120° C. in a ventilated oven in air) and then calcined at 540° C. for 4 hours in humid air having a water content equivalent to 6% by volume.

The characteristics of the catalyst obtained are given in Table 1 below.

Example 8: Preparation of Catalyst H (Inventive)

The solid H obtained in the form of extrudates according to example 7 undergoes dry impregnation with an impregnation solution prepared by dissolving nickel nitrate (Ni(NO$_3$)$_2$·6H$_2$O, Sigma®, >98%) in demineralized water. After dry impregnation, the extrudates are left to mature in a water-saturated atmosphere for 2 hours and are then dried at 120° C. for 12 hours and finally calcined in a stream of dry air at 450° C. for 2 hours. The amount of nickel nitrate in the impregnation solution is adjusted so as to obtain a nickel content as the oxide equivalent of 3% by weight NiO.

The characteristics of the catalyst obtained are given in Table 1 below.

Example 9: Properties of Catalysts A to H

Table 1 below summarizes the characteristics of the synthesized catalysts A to H.

TABLE 1

| | A | B | C | D | E | F | G | H |
|---|---|---|---|---|---|---|---|---|
| | Comparative | | | | | Inventive | | |
| Total pore volume (ml/g) | 0.72 | 0.58 | 0.58 | 0.67 | 0.57 | 0.48 | 0.44 | 0.43 |
| Mesopore volume (ml/g) | 0.30 | 0.31 | 0.31 | 0.30 | 0.50 | 0.27 | 0.36 | 0.35 |
| Macropore volume (ml/g) | 0.34 | 0.19 | 0.19 | 0.30 | 0.01 | 0.13 | 0.01 | 0.01 |
| Micropore volume (ml/g) | 0.08 | 0.08 | 0.08 | 0.07 | 0.06 | 0.08 | 0.07 | 0.07 |

TABLE 1-continued

| | | | Characteristics of the synthesized catalysts | | | | | |
|---|---|---|---|---|---|---|---|---|
| | A | B | C | D | E | F | G | H |
| | | | Comparative | | | | Inventive | |
| $S_{BET}$ (m$^2$/g) | 378 | 388 | 386 | 369 | 361 | 373 | 371 | 365 |
| TPD (g/cc) | 0.556 | 0.651 | 0.634 | 0.585 | 0.630 | 0.701 | 0.763 | 0.786 |
| Zeolite content in final catalyst in wt % | 70 | 70 | 70 | 60 | 50 | 70 | 60 | 58.2 |
| Active phase oxide equivalent in final catalyst in wt % | n.a. | n.a. | n.a. | n.a. | n.a. | n.a. | n.a. | 3.1 |
| Zeolite content by volume (kg/m$^3$) | 389 | 456 | 444 | 351 | 315 | 491 | 458 | 457 |
| SPCS (daN/mm) | 0.79 | 0.84 | 0.72 | 0.92 | 1.02 | 1.01 | 1.06 | 1.10 |

The measured characteristics of the various catalysts presented in Table 1 show that the solids prepared according to the invention permit an improvement versus the known methods of the prior art. Specifically, the combination of a neutralizing step (solids F, G, H vs. B) and a steam-treatment step (solids F, G, H vs. C and E), allied with the use of elementary particles of MFI-type zeolites of small size (solids F, G, H vs. A and D), permits a higher zeolite loading per unit volume while preserving good mechanical properties.

The invention claimed is:

1. A process for preparing a catalyst in the form of an extrudate comprising an acidic MFI-type zeolite, the zeolite content being between 45% to 90% relative to the total mass of the catalyst, and a binder, and optionally containing a hydrogenating active phase, comprising the following steps:

a) mixing of said MFI-type zeolite and of the binder, the average size of the elementary particles of said MFI-type zeolite measured by scanning electron microscopy being between 110 and 800 nm, to obtain a mixture, b) adding to said mixture obtained in step a) a peptizing agent selected from nitric acid and one or more carboxylic acids selected from acetic acid, citric acid and butyric acid, alone or as a mixture, to obtain a further mixture, c) adding to said further mixture obtained in step b) of a neutralizing agent selected from inorganic bases selected from sodium hydroxide, potassium hydroxide, and ammonia, alone or as a mixture, and organic bases in solution selected from amines and quaternary ammonium compounds, alone or as a mixture, d) shaping by extrusion the resultant mixture obtained in step c) to obtain a solid, e) optionally, drying the solid obtained in step d), f) heat-treating said solid obtained in step d) or e) in the presence of steam at a temperature of between 400 and 1000° C. and in the presence of a stream of air containing from 1% to 60% by volume of water, and g) optionally, introducing of one or more precursors of a hydrogenating active phase into the solid obtained in step f).

2. The process as claimed in claim 1, wherein the average size of the elementary particles of MFI-type zeolite measured by scanning electron microscopy is between 120 and 700 nm.

3. The process as claimed in one of claim 1, wherein the MFI-type zeolite is ZSM-5.

4. The process as claimed in claim 1, wherein the zeolite content is between 55% to 80% by weight relative to the total mass of the catalyst.

5. The process as claimed in claim 1, wherein said binder is alumina.

6. The process as claimed claim 1, wherein the peptizing agent used in step b) is nitric acid.

7. The process as claimed in claim 1, wherein the amount of peptizing agent used in step b) is defined as a total acid content, expressed as a percentage relative to the mass of dried binder introduced in step a), and is between 0.1% and 12% by weight.

8. The process as claimed in claim 1, wherein the neutralizing agent used in step c) is an inorganic base.

9. The process as claimed in claim 1, wherein the amount of neutralizing agent used in step c) is defined as a degree of neutralization expressed as a molar percentage of base relative to the amount of acid introduced in step b) and is between 1 and 200%.

10. The process as claimed in claim 1, wherein step f) is executed in the presence of a stream of air having a water content of between 1% and 50% by volume, at a temperature of between 450° C. and 850° C. and for a period of between 2 h and 10 h.

11. The process as claimed in claim 1, wherein step g) is included and the precursor(s) of the hydrogenating active phase comprise(s) at least one group VIII element and optionally at least one group VIB element.

12. The process as claimed in claim 11, wherein the content of the group VIII element is between 0.1% and 10% by weight of oxide relative to the total mass of said catalyst.

13. The process as claimed in claim 1, wherein the average size of the elementary particles of said MFI-type zeolite measured by scanning electron microscopy is between 150 and 500 nm.

14. The process as claimed in claim 1, wherein the amount of peptizing agent used in step b) is defined as a total acid content, expressed as a percentage relative to the mass of dried binder introduced in step a), and is between 0 0.1% and 6% by weight.

15. The process as claimed in claim 1, wherein the amount of peptizing agent used in step b) is defined as a total acid content, expressed as a percentage relative to the mass of dried binder introduced in step a), and is between 0.1% and 4% by weight.

16. The process as claimed in claim 1, wherein the neutralizing agent used in step c) is ammonia.

17. The process as claimed in claim 1, wherein the neutralizing agent used in step c) is ammonia in aqueous solution (NH4OH).

18. The process as claimed in claim 1, wherein the amount of neutralizing agent used in step c) is defined as a degree of neutralization expressed as a molar percentage of base relative to the amount of acid introduced in step b) and is between 10 and 100%.

19. The process as claimed in claim 1, wherein step f) is executed in the presence of a stream of air having a water content of between 1% and 10% by volume, at a temperature of between 450° C. and 850° C. and for a period of between 2 h and 10 h.

20. The process as claimed in claim 11, wherein the content of the group VIII element is between 0.5% and 8% by weight of oxide relative to the total mass of said catalyst.

21. The process as claimed in claim 11, wherein the content of the group VIII element is between 1% and 6% by weight of oxide relative to the total mass of said catalyst.

22. The process as claimed in claim 1, wherein step e) is included.

23. The process as claimed in claim 1, wherein step g) is included and the precursor(s) of the hydrogenating active phase comprise(s) at least one group VIII element and at least one group VIB element.

* * * * *